Dec. 21, 1965   J. W. HOLDEMAN ETAL   3,224,299

DIFFERENTIAL MECHANISM

Filed Sept. 7, 1962   3 Sheets-Sheet 1

Inventors:
John W. Holdeman
William G. Jeakle
By: Thomas B. Hunter   Atty.

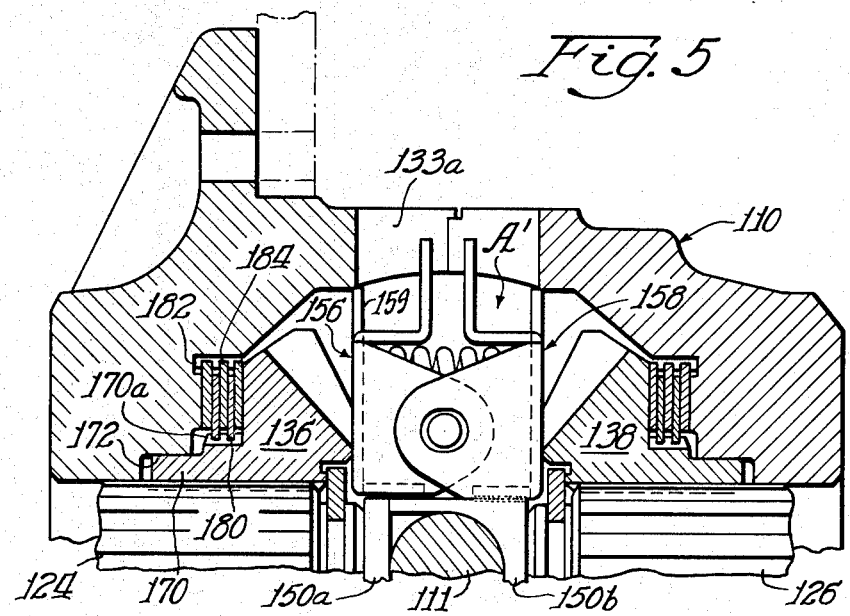
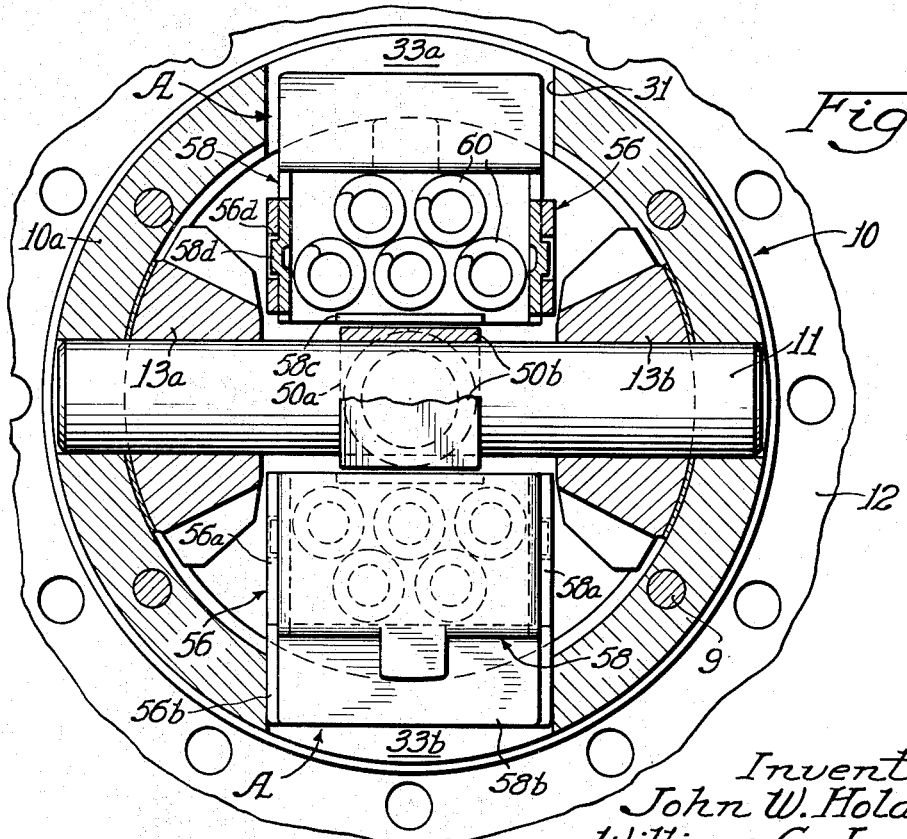

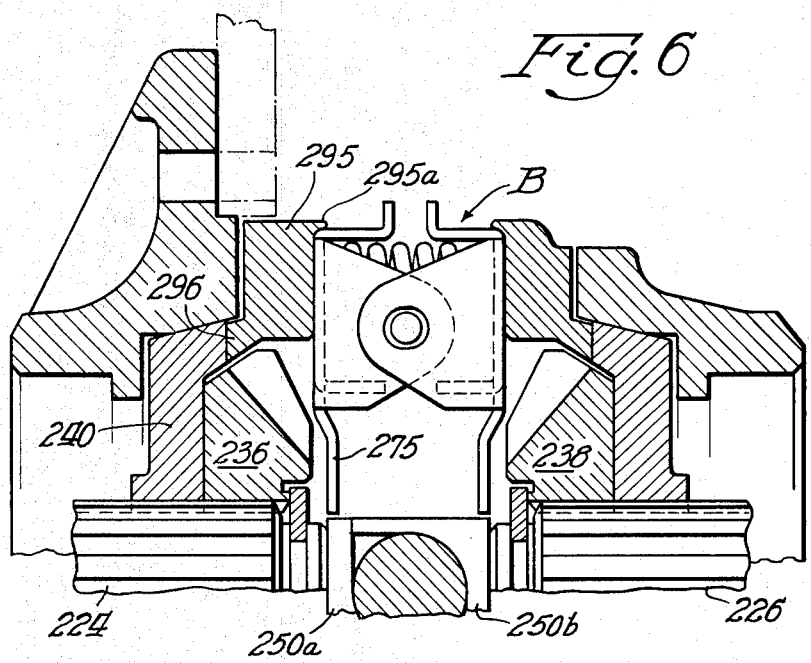
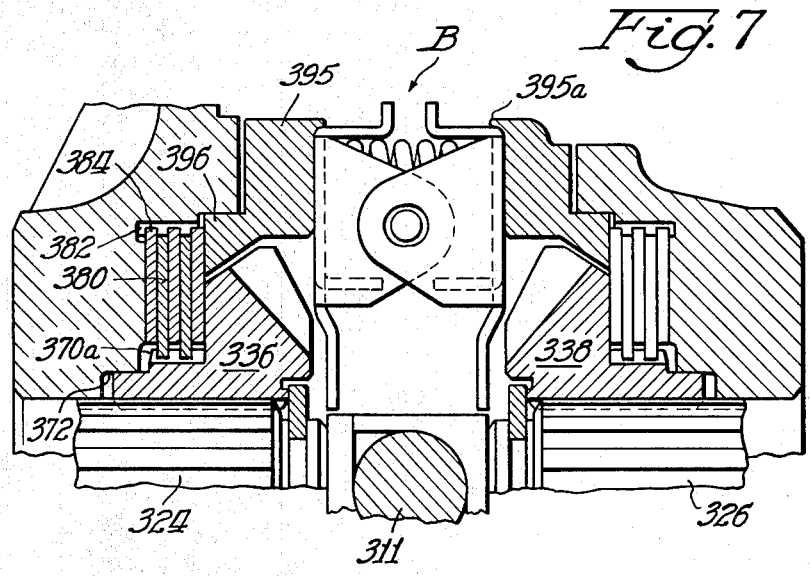

United States Patent Office 3,224,299
Patented Dec. 21, 1965

3,224,299
DIFFERENTIAL MECHANISM
John W. Holdeman and William G. Jeakle, Auburn, Ind., assignors to Borg-Warner Corporation, Chicago, Ill., a corporation of Illinois
Filed Sept. 7, 1962, Ser. No. 221,948
8 Claims. (Cl. 74—711)

The present invention relates to improvements in differential mechanisms, and more particularly to differential mechanisms of the limited differentiation type.

In one conventional rear axle unit, shown for example in the R. M. Riblet Patent No. 2,140,190, retaining means for limiting movement of the axles axially outwardly is positioned within the differential casing.

In assembling this type of unit, the side gears and pinions are initially positioned within the differential casing. The inner portions of the output shafts, preferably splined, are inserted through complementary splined bores in the side gears, and the retaining means, usually horseshoe-shaped washers or locking nuts, are secured to the ends of the output shafts. The output shafts are then drawn axially outwardly so that the retaining means engages the inner faces of the side gears. Inward axial thrust of the axles or output shafts is ordinarily taken by a tapered bearing in the axle housing, or on thrust means associated with the pinion cross shaft.

In the type of assembly just described, it has been difficult to provide an effective limited slip or differentiation retarding means of the cumulative torque type which utilizes an initial spring preload feature. In one known assembly, a disc-type clutchpack is interposed between the side gears and gear casing, but no preload is employed because heretofore it has been impractical to add the preload means at the final stage of the axle assembly.

It is therefore a principal object of the present invention to provide an improved differential mechanism including means for retarding differentiation under conditions when a wheel associated with one of the differential output shafts or axles loses traction.

Still another object of the invention is to provide a limited slip differential in combination with a cartridge-type unit adapted to be quickly inserted within the differential casing to preload the differentiation retarding means.

Other and more particular objects and advantages will be apparent from the following detailed description taken in connection with the drawings wherein:

FIGURE 2 is a cross-sectional view taken along the plane of section line 2—2 of FIGURE 1;

FIGURE 5 is a cross-sectional view of a second embodiment of the present invention;

FIGURE 6 is a partial cross-sectional view of a third embodiment of the present invention; and FIGURE 7 is a partial cross-sectional view of a fourth embodiment of the present invention.

Figure 1:
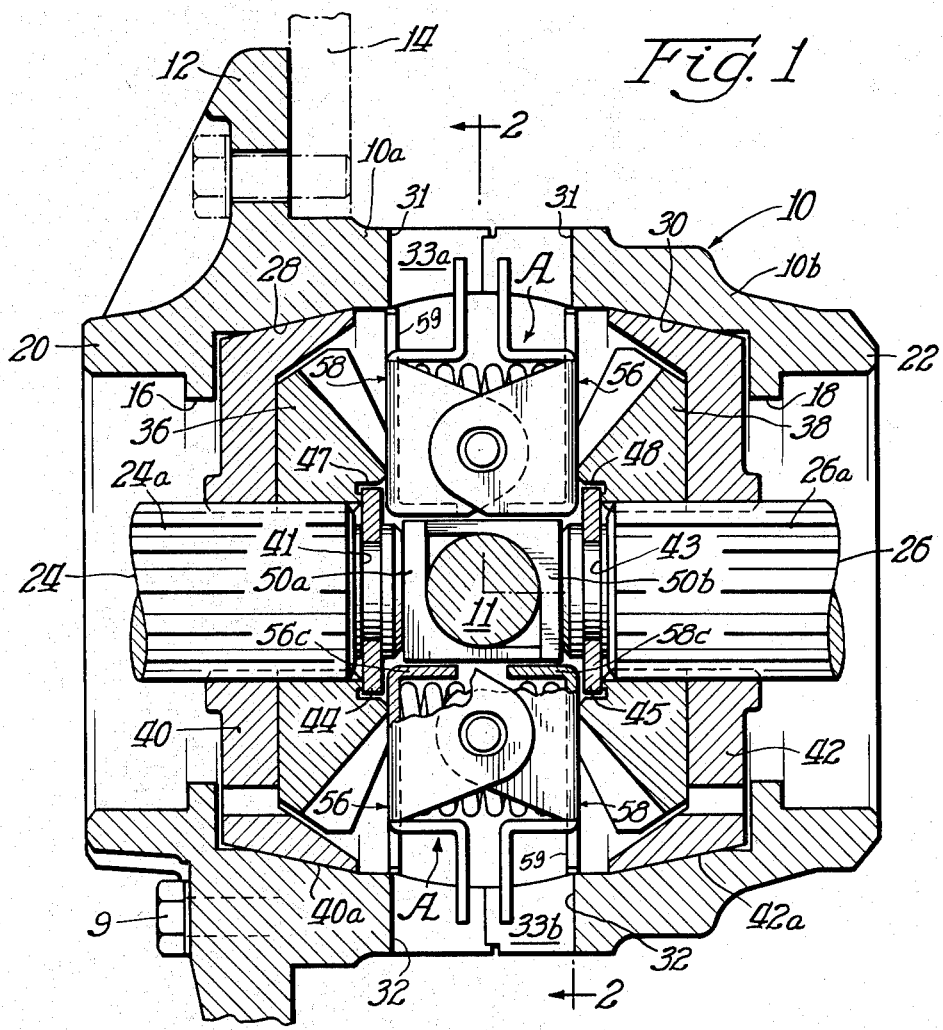
FIGURE 1 is a cross-sectional view of a differential mechanism constructed in accordance with the principles of the present invention.

Referring now to the drawings, particularly FIGURES 1 and 2, there is illustrated a first embodiment of a differential mechanism including a casing 10, formed in two mating sections 10a, 10b, having an integral radially extending flange 12 adapted to be connected to a ring gear (shown in dotted lines and indicated at 14), said ring gear adapted to be driven from the engine drive shaft in a manner familiar to those skilled in the art.

Casing 10 is provided with a pair of diametrically opposed openings 16 and 18 formed in hub members 20 and 22. Extending inwardly into the casing through each of the openings 16 and 18 are a pair of rotary output shafts or axles 24 and 26 adapted to be connected to the driving wheels.

The differential casing 10 is further provided with a pair of internal, generally frusto-conical, surfaces 28 and 30 inboard of the hub members 20 and 22. While the casing is disclosed as being formed in a pair of mating sections 10a and 10b, secured by capscrews 9, it will be understood that the casing could be manufactured as an integral unit. In the example shown, each of the mating sections are provided with a pair of cut-out portions 31 and 32 which provide a pair of access openings 33a, 33b on opposite sides of the casing for the reception of a cartridge-type spring biasing assembly, said assembly constituting an important aspect of the present invention which is to be described below in greater detail.

The inner ends of output members 24 and 26 preferably contain a splined section 24a and 26a receiving complementary splined side gears 36 and 38 adjacent the end portions thereof and complementary splined clutch members 40 and 42 having external, generally frusto-conical surfaces 40a, 42a respectively, adapted to engage the internal frusto-conical surfaces of the casing 28 and 30 respectively.

Meshing with the side gears 36 and 38 are the pinions or compensating gears 13a, 13b rotatably journaled on the cross shaft 11 which is secured to and rotatable with the casing 10. The meshing teeth on the pinions and side gears respectively are so designed that there is positive tooth pressure tending to separate the side gears when torque is applied to the casing. This feature is more particularly described in the J. M. R. Lyeth, Jr., Patent No. 2,821,096.

The innermost portions of output shafts 24 and 26 further include an annular groove 41, 43 for the reception of retaining washers 44, 45 respectively to limit axial movement of the shafts 24 and 26 outwardly. It will be noted that the side gears 36 and 38 are each provided with an annular recess or counterbore 47, 48 to accommodate the retaining washers 44 and 45 respectively.

Figure 4:
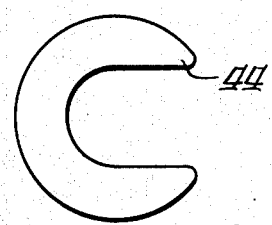
FIGURE 4 is a plan view of a retaining washer used to secure the differential output shafts.

By the above described arrangement, the assembly procedure is greatly simplified. A pre-assembled unit is first formed, said unit comprising the differential casing, the cross shaft, the pinions, the clutch members and the side gears. This sub-assembly may be conveniently shipped to the assembly plant as a unit and installed within the axle housing. Afterwards, the axles or output shafts are piloted through the axle housing (not shown) and their splined ends are fitted within the complementary splined bore in the clutch members and side gears. The ends of the output shafts are displaced axially inboard of the position shown in FIGURE 1 so that the grooves 41, 43 in each of said shafts are spaced inboard of the inner faces of the side gears. The retaining washers 44 and 45 (shown in FIGURE 4), which are generally in the form of a horseshoe or C, are inserted into grooves 41 and 43 in output shafts 24 and 26 respectively; and then said shafts are displaced axially outwardly so that the washers 44 and 45 are received in the recesses or counterbores 47, 48 in side gears 36 and 38. When so positioned, the retaining washers prevent any further movement of the shafts axially outwardly. Inward thrust of the output shafts is taken on a pair of generally L-shaped blocks 50a, 50b and transmitted in a generally equalized fashion directly to the cross shaft 11; or if there is clearance between the thrust blocks and the cross shaft, thrust is transmitted to the opposite side gear and through the cone to the casing.

Figure 3:
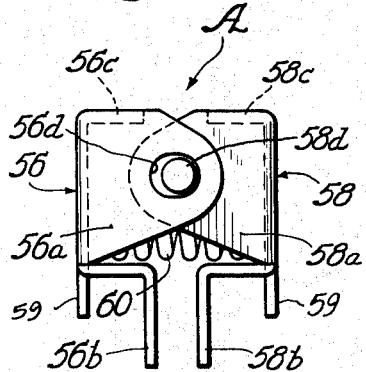
FIGURE 3 is a detailed side elevational view of a spring assembly employed to bias the friction members into engagement.

To provide a preload or initial outward bias to the clutch members, a cartridge-type spring assembly A (FIGURE 3) is insertable through the openings 33a, 33b on both sides of said casing. Each spring assembly comprises spring retainer means including a pair of mutually connected plates or members 56, 58 providing limited movement toward and away from each other. Plates 56, 58 have up-turned ears 56a, 58a on both sides thereof, tab members 56b, 58b extending outwardly from one end thereof, and inturned flanges 56c, 58c engaging thrust blocks 50a, 50b. The up-turned ears of biasing plate 58 are each provided with a projecting boss 58d received within an elongated aperture 56d on the up-turned ears 56a of the cooperating biasing plate 56. This projecting boss 58d is preferably pressed out of the side of the upstanding ears on each plate member and slanted to facilitate assembly, but it is obvious that pins or some other suitable pivot means could be substituted therefor. The biasing plates also include retainer tabs 59 which are adapted to engage the casing to prevent the spring assemblies from being accidentally dislodged from their operative positions.

A plurality of energy spring units 60 are positioned between plates 56 and 58 to bias them apart. The boss 58d is slidable within the elongated aperture 56d but is limited in movement by the ends of said aperture to determine the maximum spacing between the plates.

In assembling the unit, after the output shafts have been retained within the clutch members and side gears as described earlier, the next step comprises the insertion of the thrust blocks through openings 33a, 33b to their positions on both sides of the cross shaft 11. Next, the spring assemblies A are positioned so as to form a generally wedge-shaped unit wherein the sides of the plate members taper inwardly toward the end which is to be inserted. The spring assemblies are then forcefully urged between the side gears and permitted to snap into place providing a powerful biasing force to separate the side gears, and force the conical surfaces of the clutch members into engagement with the complementary conical surfaces on the casing.

To remove the spring assemblies, a tool adapted to provide a compressive force, such as a pair of pliers or similar instrument, is employed to compress the outwardly extending tab portions 56b, 58b of the respective spring assemblies. After the respective biasing plates 56, 58 have been moved toward each other so that tabs 59 are disengaged, the entire assembly is readily removed through apertures 33a and 33b respectively.

Referring now to FIGURE 5, there is shown a second embodiment of the present invention employing a multiple disc type clutch mechanism in place of the conical clutch members described in connection with FIGURES 1 and 2. In most respects, the embodiment illustrated in FIGURE 5, with the exception of the different friction engaging means, is substantially the same as that described above. To simplify the explanation, only one side of the unit will be described, since it should be clear that the same arrangement exists on the opposite side.

As shown in FIGURE 5, the side gears 136, 138 are each provided with axially extending hub portions 170 which are received within counterbores 172 in casing 110. The side gear hub portions 170 are provided with an externally splined section 170a carrying a plurality of friction disc members 180 thereon, all of said friction disc members being axially movable along said splined section. The casing 110 is provided with an internal splined section 182 carrying a plurality of friction disc units 184 which are likewise slidable axially on said splined portion. The friction discs 180 are thus rotatable with the side gears and the output shaft 124 while friction discs 184 are rotatable with the casing and the discs are alternatively arranged to provide an interleaved disc-type friction clutch unit which upon engagement by axial loading permits torque to be transmitted directly from the casing through the side gear hub portions to the output shafts 124 and 126.

This particular embodiment employs a modified form A' of the previously described spring assembly A which modification is characterized by the thrust block means 150a and 150b being fixedly or loosely connected to the biasing plates 156–158. This arrangement forms a cartridge-type assembly which, when inserted through apertures 133a and 133b, effects the positioning of both the thrust blocks and the preload means. It should be understood that the same type of construction may be used in the first embodiment shown in FIGURES 1 and 2, and with minor changes in the embodiments subsequently described.

It has been found to be desirable in certain instances to provide independent biasing or loading of the clutch mechanism, rather than loading the clutch mechanism through the side gears. Accordingly, in FIGURE 6 a third embodiment is shown wherein a modified spring assembly is interposed directly between the conical clutch members corresponding to those illustrated and described in FIGURES 1 and 2.

Referring now to FIGURE 6, the spring assembly B is provided with elongated side portions 275a adapted to engage the thrust blocks 250a and 250b. Axial loading of the clutch cones 240 is accomplished through a pair of annular pressure plates 295 which have an annular extension or hub 296 engaging the peripheral portion of the clutch cones 240. The pressure plates 295 are further provided with a lip 295a which engages the spring assembly plates and retains them in position by virtue of their normal outward bias.

Another alternative form of the invention which may be regarded as a combination of certain features described in connection with FIGURES 5 and 6 employs a multiple disc friction unit in place of the conical clutch members 340 and 342. The spring assembly loads pressure plates 395 providing an axial thrust against the innermost friction discs mounted on the hub portion of the side gears. In all other respects, this modification is substantially identical to that described in connection with FIGURE 6.

While the invention has been described in connection with certain specific embodiments thereof, it is to be understood that this is by way of illustration and not by way of limitation and the scope of the invention is defined solely by the appended claims which should be construed as broadly as the prior art will permit.

What is claimed is:

1. In a differential mechanism: a casing including access apertures; differential gearing in said casing, said differential gearing including a pair of side gears and a pinion gear rotatably mounted in said casing on a cross shaft; a pair of output shafts each having a terminal portion extending into said casing and being drivingly connected to said side gears respectively; differentiation retarding means in said casing adapted, when engaged, to clutch said casing and said output shafts together for conjoint rotation; preload means normally urging said differentiation retarding means into engagement, said preload means comprising at least one cartridge-type resilient assembly, said assembly including spring retainer means including a pair of mutually connected members providing limited movement toward and away from each other and spring means operatively associated with said retainer means for urging said retainers outwardly.

2. The combination as defined in claim 1 including thrust block means for limiting thrust of said output shafts axially inwardly, said thrust block means comprising members adapted to transmit thrust from said output shafts to said casing.

3. The combination as defined in claim 1 wherein said cartridge-type assemblies include thrust block means adapted to limit inward axial movement of the terminal portions of said output shafts and transmit thrust from said output shafts to said cross shaft.

4. In a differential mechanism: a casing including access aperture means and provided with an internal conical friction surface; differential gearing in said casing, said differential gearing including a pair of side gears; a pair of output shafts each having terminal portions extending into said casing and being drivingly connected to said side gears; differentiation retarding means adapted, when engaged, to clutch said casing and said output shafts together for conjoint rotation, said differentiation retarding means comprising at least one conical clutch member having an exterior conical friction surface cooperating with said internal conical friction surface to clutch together said casing and said output shafts; preload means normally urging said differentiation retarding means into engagement, said preload means comprising at least one cartridge-type resilient assembly, said assembly including a pair of spaced spring retainers and spring means operatively associated with said retainers for urging retainers outwardly.

5. In a differential mechanism: a casing including access aperture means; differential gearing in said casing, said differential gearing including a pair of side gears; a pair of output shafts each having terminal portions extending into said casing and being drivingly connected to each of said side gears respectively; differentiation retarding means adapted, when engaged, to clutch said casing and said output shafts together for conjoint rotation, said differentiation retarding means including a multiple disc type clutch pack between each of said output shafts and said casing respectively; and preload means in said casing normally urging said differentiation retarding means into engagement, said preload means comprising at least one cartridge-type resilient assembly, said assembly including a pair of spaced retainers and spring means operatively associated with said retainers for urging said retainers outwardly.

6. In a differential mechanism, a casing including access apertures; differential gearing in said casing including a pair of oppositely facing side gears and a pinion gear rotatably mounted in said casing on a cross-shaft; a pair of output shafts each having a terminal portion extending into said casing and being drivingly connected to said side gears respectively, means defining a circumferential groove in each of said output shaft terminal portions, a retaining washer received in each of said grooves, and means defining an annular recess in each of the opposing faces of said side gears adapted to accommodate said retaining washers respectively; differentiation retarding means in said casing adapted, when engaged, to clutch said casing and said output shaft together for conjoint rotation; preload means normally urging said differentiation retarding means into engagement, said preload means comprising at least one cartridge-type resilient assembly characterized by a unitary, integrated construction to facilitate insertion and removal through said access apertures.

7. In a differential mechanism: a casing including access apertures; differential gearing in said casing, said differential gearing including a pair of side gears and a pinion gear rotatably mounted in said casing on a cross shaft; a pair of output shafts each having a terminal portion extending into said casing and being drivingly connected to said side gears respectively; differentiation retarding means in said casing adapted, when engaged, to clutch said casing and said output shafts together for conjoint rotation; preload means insertable through said access apertures normally urging said differentiation retarding means into engagement, said preload means comprising at least one cartridge-type resilient assembly including first and second plate members secured together in generally parallel relation for limited movement toward and away from each other, and spring means operatively positioned between said plate members normally urging said plate members apart.

8. In a differential mechanism: a casing including access aperture means and provided with an internal conical friction surface; differential gearing in said casing, said differential gearing including a pair of side gears; a pair of output shafts each having terminal portions extending into said casing and being drivingly connected to said side gears respectively; differentiation retarding means adapted, when engaged, to clutch said casing and said output shafts together for conjoint rotation said differentiation retarding means comprising at least one clutch member having an exterior conical friction surface cooperating with said internal conical friction surface to clutch together said casing and said output shafts; an annular pressure plate independent of said side gears; preload means normally urging said differentiation retarding means into engagement with said preload means comprising at least one cartridge-type resilient assembly characterized by a unitary, integrated construction to facilitate insertion and removal through said access aperture means, said preload means being operatively positioned to urge said differentiation retarding means into engagement through said pressure plate.

References Cited by the Examiner

UNITED STATES PATENTS

| | | | |
|---|---|---|---|
| 1,226,854 | 5/1917 | Bower | 74—713 |
| 1,616,627 | 2/1927 | Hunt | 74—713 |
| 2,140,190 | 12/1938 | Riblet | 74—713 |
| 2,397,374 | 3/1946 | Schlicksupp | 74—711 |
| 2,553,260 | 5/1951 | Oldofredi | 267—1 |
| 2,966,076 | 12/1960 | O'Brien | 74—710.5 |
| 2,985,035 | 5/1961 | Toth | 74—711 |
| 3,027,781 | 4/1962 | O'Brien | 74—711 |
| 3,036,826 | 5/1962 | Pickell | 267—1 |

FOREIGN PATENTS 879,671  10/1961  Great Britain.

DON A. WAITE, *Primary Examiner.*